(12) United States Patent
O'Connor et al.

(10) Patent No.: US 9,779,219 B2
(45) Date of Patent: Oct. 3, 2017

(54) METHOD AND SYSTEM FOR LATE BINDING OF OPTION FEATURES ASSOCIATED WITH A DEVICE USING AT LEAST IN PART LICENSE AND UNIQUE ID INFORMATION

(75) Inventors: Clint H. O'Connor, Austin, TX (US); Gary D. Huber, Austin, TX (US); James W. Clardy, Austin, TX (US); Michael Haze, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 13/570,581

(22) Filed: Aug. 9, 2012

(65) Prior Publication Data
US 2014/0047133 A1 Feb. 13, 2014

(51) Int. Cl.
*H04L 29/06* (2006.01)
*G06F 21/10* (2013.01)

(52) U.S. Cl.
CPC .................................. *G06F 21/10* (2013.01)

(58) Field of Classification Search
CPC ....................................................... G06F 21/10
USPC ...... 710/8, 10, 14, 16, 100–102; 713/1, 100, 713/182; 726/26; 700/9, 90
See application file for complete search history.

(56) References Cited

U.S. PATENT DOCUMENTS

| | | | |
|---|---|---|---|
| 5,440,498 A | 8/1995 | Timm | |
| 5,442,541 A * | 8/1995 | Hube et al. | ........................ 700/9 |
| 5,490,216 A | 2/1996 | Richardson, III | |
| 5,502,831 A | 3/1996 | Grube et al. | |
| 5,659,614 A | 8/1997 | Bailey, III | |
| 5,715,314 A | 2/1998 | Payne et al. | |
| 5,745,568 A | 4/1998 | O'Connor et al. | |
| 5,864,664 A | 1/1999 | Capps, Jr. et al. | |
| 5,890,165 A | 3/1999 | Boudrie | |
| 5,892,900 A | 4/1999 | Ginter et al. | |
| 5,912,696 A | 6/1999 | Buehl | |
| 5,948,078 A | 9/1999 | Joffe | |
| 5,956,505 A * | 9/1999 | Manduley | ......................... 713/1 |

(Continued)

FOREIGN PATENT DOCUMENTS

GB        2445303 A        7/2008

OTHER PUBLICATIONS

Laplink, Laplink Offers Licensing for Windows XP to Windows 7 Upgrade Solution, Oct. 28, 2009.

(Continued)

*Primary Examiner* — Tammara Peyton
(74) *Attorney, Agent, or Firm* — Terrile, Cannatti, Chambers & Holland, LLP; Stephen A. Terrile (57) ABSTRACT

A system, method, and computer-readable medium are disclosed for entitling the implementation of a feature associated with a device after it is manufactured. A feature entitlement management system receives a device's unique identifier, which is then processed to determine which features associated with the device are available for implementation. Once determined, the available features are provided to the user of the device, who in turn selects a feature for implementation. A feature entitlement is then generated by performing late binding entitlement operations to associate the selected feature's corresponding entitlement data with the device's unique identifier. The resulting feature entitlement is then is processed to implement the selected feature.

12 Claims, 8 Drawing Sheets

(56) References Cited

U.S. PATENT DOCUMENTS

| | | |
|---|---|---|
| 6,032,184 A | 2/2000 | Cogger |
| 6,032,859 A | 3/2000 | Muehlberger et al. |
| 6,080,207 A | 6/2000 | Kroening et al. |
| 6,112,188 A | 8/2000 | Hartnett |
| 6,170,059 B1 | 1/2001 | Pruett et al. |
| 6,189,008 B1 | 2/2001 | Easty |
| 6,209,089 B1 | 3/2001 | Selitrennikoff et al. |
| 6,226,618 B1 | 5/2001 | Downs |
| 6,243,468 B1 | 6/2001 | Pearce et al. |
| 6,292,941 B1 | 9/2001 | Jollands |
| 6,301,612 B1 | 10/2001 | Selitrennikoff et al. |
| 6,314,418 B1 | 11/2001 | Namba |
| 6,321,231 B1 | 11/2001 | Jebens et al. |
| 6,321,262 B1 | 11/2001 | Springer |
| 6,324,525 B1 | 11/2001 | Kramer et al. |
| 6,389,403 B1 | 5/2002 | Dorak, Jr. |
| 6,425,126 B1 | 7/2002 | Branson et al. |
| 6,502,205 B1 | 12/2002 | Yanai et al. |
| 6,611,814 B1 | 8/2003 | Lee et al. |
| 6,642,946 B1 | 11/2003 | Janes et al. |
| 6,647,532 B1 | 11/2003 | Boede et al. |
| 6,694,384 B1 * | 2/2004 | Moeller et al. .................... 710/8 |
| 6,721,881 B1 | 4/2004 | Bian et al. |
| 6,816,090 B2 | 11/2004 | Teckchandani et al. |
| 6,829,704 B2 * | 12/2004 | Zhang et al. ..................... 713/1 |
| 6,865,655 B1 | 3/2005 | Andersen |
| 6,931,407 B1 | 8/2005 | Brown |
| 6,931,558 B1 | 8/2005 | Jeffe et al. |
| 6,944,611 B2 | 9/2005 | Flank et al. |
| 7,047,411 B1 | 5/2006 | DeMello et al. |
| 7,093,032 B2 * | 8/2006 | Minogue et al. ................. 710/8 |
| 7,120,593 B1 | 10/2006 | Fry et al. |
| 7,130,807 B1 | 10/2006 | Mikurak |
| 7,278,131 B2 | 10/2007 | Gunyakti et al. |
| 7,290,149 B2 | 10/2007 | Alababra et al. |
| 7,308,410 B2 | 12/2007 | Bowe, Jr. et al. |
| 7,330,997 B1 | 2/2008 | Odom |
| 7,346,585 B1 | 3/2008 | Alabraba et al. |
| 7,352,999 B2 | 4/2008 | Miettinen |
| 7,412,534 B2 | 8/2008 | Tsang et al. |
| 7,415,439 B2 | 8/2008 | Kontio et al. |
| 7,417,546 B2 | 8/2008 | Llorca et al. |
| 7,428,413 B2 | 9/2008 | Fink |
| 7,444,436 B2 * | 10/2008 | Wille ................................ 710/8 |
| 7,472,272 B2 | 12/2008 | Stamos et al. |
| 7,483,860 B2 | 1/2009 | Cronce et al. |
| 7,496,739 B1 | 2/2009 | Raghavan et al. |
| 7,503,072 B2 | 3/2009 | Hughes et al. |
| 7,506,382 B2 | 3/2009 | Padole et al. |
| 7,516,104 B1 | 4/2009 | Scardino |
| 7,523,072 B2 | 4/2009 | Stefik et al. |
| 7,526,451 B2 | 4/2009 | Park et al. |
| 7,546,545 B2 | 6/2009 | Garbow et al. |
| 7,555,447 B2 | 6/2009 | Chinnappan et al. |
| 7,565,325 B2 | 7/2009 | Lenard et al. |
| 7,593,898 B1 | 9/2009 | Tsuei et al. |
| 7,594,275 B2 | 9/2009 | Zhu et al. |
| 7,653,574 B2 | 1/2010 | Harper et al. |
| 7,656,271 B2 | 2/2010 | Ehrman et al. |
| 7,720,720 B1 | 5/2010 | Sharma et al. |
| 7,743,064 B2 | 6/2010 | Faulkner et al. |
| 7,761,921 B2 * | 7/2010 | Gannon et al. ................. 726/26 |
| 7,783,737 B2 | 8/2010 | Fujino et al. |
| 7,809,699 B2 | 10/2010 | Passmore et al. |
| 7,925,973 B2 | 4/2011 | Allaire et al. |
| 7,966,219 B1 | 6/2011 | Singh et al. |
| 7,971,199 B1 | 6/2011 | Chen |
| 8,001,052 B2 | 8/2011 | Dunkeld et al. |
| 8,065,303 B2 | 11/2011 | Probst et al. |
| 8,126,814 B2 | 2/2012 | Yellai et al. |
| 8,180,681 B2 | 5/2012 | Pieper et al. |
| 8,219,769 B1 | 7/2012 | Wilk |
| 8,219,850 B1 | 7/2012 | Wang et al. |
| 8,229,858 B1 | 7/2012 | Mazza et al. |
| 8,230,434 B2 | 7/2012 | Armstrong et al. |
| 8,261,258 B1 | 9/2012 | Jianu et al. |
| 8,271,336 B2 | 9/2012 | Mikurak |
| 8,341,455 B2 | 12/2012 | Maki et al. |
| 8,429,641 B2 | 4/2013 | O'Connor et al. |
| 8,452,731 B2 | 5/2013 | Preslan et al. |
| 8,468,139 B1 | 6/2013 | O'Connor et al. |
| 8,510,226 B2 * | 8/2013 | Coley et al. ..................... 705/59 |
| 8,533,156 B2 | 9/2013 | Ryder |
| 8,538,458 B2 | 9/2013 | Haney |
| 8,548,919 B2 | 10/2013 | Lo et al. |
| 8,615,446 B2 | 12/2013 | O'Connor et al. |
| 8,645,398 B2 | 2/2014 | Xia et al. |
| 8,682,795 B2 | 3/2014 | Lenkov et al. |
| 8,688,586 B2 | 4/2014 | Pride et al. |
| 8,700,533 B2 | 4/2014 | Levin et al. |
| 8,949,401 B2 | 2/2015 | Haze et al. |
| 9,100,396 B2 * | 8/2015 | O'Connor et al. |
| 2001/0044782 A1 | 11/2001 | Hughes et al. |
| 2002/0046232 A1 | 4/2002 | Adams et al. |
| 2002/0059270 A1 | 5/2002 | Schlabach et al. |
| 2002/0076204 A1 | 6/2002 | Nakano et al. |
| 2002/0077986 A1 | 6/2002 | Kobata et al. |
| 2002/0087345 A1 | 7/2002 | Bly et al. |
| 2002/0088855 A1 | 7/2002 | Hodes |
| 2002/0091456 A1 | 7/2002 | O'Connor |
| 2003/0028439 A1 | 2/2003 | Cox |
| 2003/0028451 A1 | 2/2003 | Ananian |
| 2003/0033205 A1 | 2/2003 | Nowers et al. |
| 2003/0036873 A1 | 2/2003 | Sierer et al. |
| 2003/0060157 A1 | 3/2003 | Henrick |
| 2003/0088571 A1 | 5/2003 | Ekkel |
| 2003/0110126 A1 | 6/2003 | Dunkeld et al. |
| 2003/0120928 A1 | 6/2003 | Cato et al. |
| 2003/0149750 A1 | 8/2003 | Franzenburg |
| 2004/0003039 A1 | 1/2004 | Humphrey et al. |
| 2004/0022227 A1 | 2/2004 | Lynch et al. |
| 2004/0044901 A1 | 3/2004 | Serkowski et al. |
| 2004/0059938 A1 | 3/2004 | Hughes et al. |
| 2004/0093273 A1 | 5/2004 | Laurent et al. |
| 2004/0128551 A1 | 7/2004 | Walker et al. |
| 2004/0133792 A1 | 7/2004 | Dublish et al. |
| 2004/0143746 A1 | 7/2004 | Ligeti et al. |
| 2004/0250066 A1 | 12/2004 | DiLuoffo et al. |
| 2004/0268267 A1 | 12/2004 | Moravcsik |
| 2005/0027657 A1 | 2/2005 | Leontiev et al. |
| 2005/0060388 A1 | 3/2005 | Tasumi et al. |
| 2005/0229047 A1 | 10/2005 | Hanes et al. |
| 2005/0262573 A1 | 11/2005 | Bo et al. |
| 2005/0268115 A1 | 12/2005 | Barde et al. |
| 2006/0062426 A1 | 3/2006 | Levy et al. |
| 2006/0161635 A1 | 7/2006 | Lamkin et al. |
| 2006/0212649 A1 | 9/2006 | Roberts, Jr. |
| 2006/0229904 A1 | 10/2006 | Hunter et al. |
| 2006/0276174 A1 | 12/2006 | Katz et al. |
| 2007/0106586 A1 | 5/2007 | Mack |
| 2007/0124349 A1 | 5/2007 | Taylor |
| 2007/0130233 A1 | 6/2007 | Christensen |
| 2007/0157196 A1 | 7/2007 | Goicea et al. |
| 2007/0174621 A1 | 7/2007 | Ducharme |
| 2007/0233580 A1 | 10/2007 | Pike et al. |
| 2007/0255758 A1 | 11/2007 | Zheng et al. |
| 2007/0294566 A1 | 12/2007 | Solyanik |
| 2008/0005033 A1 | 1/2008 | Clark et al. |
| 2008/0077927 A1 | 3/2008 | Armstrong et al. |
| 2008/0109446 A1 | 5/2008 | Wang |
| 2008/0172583 A1 | 7/2008 | Mahajan et al. |
| 2008/0177807 A1 | 7/2008 | Dile et al. |
| 2008/0195871 A1 | 8/2008 | Peinado et al. |
| 2008/0208933 A1 | 8/2008 | Lyon |
| 2008/0215633 A1 | 9/2008 | Dunkeld et al. |
| 2008/0234047 A1 | 9/2008 | Nguyen |
| 2008/0301676 A1 | 12/2008 | Alpern et al. |
| 2009/0063350 A1 | 3/2009 | Briggs et al. |
| 2009/0083843 A1 | 3/2009 | Wilkinson et al. |
| 2009/0089340 A1 | 4/2009 | Ohr et al. |
| 2009/0094647 A1 | 4/2009 | Inoue et al. |
| 2009/0125393 A1 | 5/2009 | Hwang et al. |
| 2009/0164470 A1 | 6/2009 | Savage et al. |
| 2009/0187491 A1 | 7/2009 | Bull et al. |

(56) References Cited

U.S. PATENT DOCUMENTS

| | | |
|---|---|---|
| 2009/0193102 A1 | 7/2009 | Trujillo |
| 2009/0217352 A1 | 8/2009 | Shen et al. |
| 2009/0228368 A1 | 9/2009 | Brown |
| 2009/0228488 A1 | 9/2009 | Brand et al. |
| 2009/0234892 A1 | 9/2009 | Anglin et al. |
| 2009/0248883 A1 | 10/2009 | Suryanarayana et al. |
| 2009/0265545 A1 | 10/2009 | Satoh et al. |
| 2009/0300673 A1 | 12/2009 | Bachet et al. |
| 2009/0300719 A1 | 12/2009 | Ferris |
| 2010/0106687 A1 | 4/2010 | Marcy et al. |
| 2010/0106691 A1 | 4/2010 | Preslan et al. |
| 2010/0122030 A1 | 5/2010 | Peters et al. |
| 2010/0125903 A1 | 5/2010 | Devarajan et al. |
| 2010/0146425 A1 | 6/2010 | Lance et al. |
| 2010/0174918 A1 | 7/2010 | Hoffman et al. |
| 2010/0229243 A1 | 9/2010 | Lin et al. |
| 2010/0235921 A1 | 9/2010 | Foster |
| 2010/0257142 A1 | 10/2010 | Murphy et al. |
| 2010/0257185 A1 | 10/2010 | Dvir et al. |
| 2010/0257346 A1 | 10/2010 | Sosnosky et al. |
| 2010/0257403 A1 | 10/2010 | Virk et al. |
| 2010/0306227 A1 | 12/2010 | Fleming et al. |
| 2010/0306267 A1 | 12/2010 | Zamkoff et al. |
| 2010/0319072 A1 | 12/2010 | Abzarian et al. |
| 2010/0325735 A1 | 12/2010 | Etchegoyen |
| 2011/0016466 A1 | 1/2011 | Liu et al. |
| 2011/0022812 A1 | 1/2011 | van der Linden et al. |
| 2011/0063234 A1 | 3/2011 | Liu |
| 2011/0072291 A1 | 3/2011 | Murase |
| 2011/0099200 A1 | 4/2011 | Blount et al. |
| 2011/0107411 A1 | 5/2011 | McClain et al. |
| 2011/0173405 A1 | 7/2011 | Grabarnik et al. |
| 2011/0178886 A1 | 7/2011 | O'Connor et al. |
| 2011/0178887 A1 | 7/2011 | O'Connor et al. |
| 2011/0184998 A1 | 7/2011 | Palahnuk et al. |
| 2011/0231280 A1 | 9/2011 | Farah |
| 2011/0231281 A1 | 9/2011 | O'Connor et al. |
| 2011/0246766 A1 | 10/2011 | Orsini et al. |
| 2011/0314363 A1 | 12/2011 | Isozu et al. |
| 2012/0036041 A1 | 2/2012 | Hesselink |
| 2012/0191272 A1 | 7/2012 | Andersen et al. |
| 2012/0191568 A1 | 7/2012 | Gandhi |
| 2012/0197811 A1 | 8/2012 | Kearney et al. |
| 2012/0221709 A1 | 8/2012 | Bowes et al. |
| 2012/0304248 A1 | 11/2012 | Watts et al. |
| 2013/0067332 A1 | 3/2013 | Greenwood et al. |
| 2013/0074011 A1 | 3/2013 | Nakamura et al. |
| 2013/0132240 A1 | 5/2013 | Aguilar |
| 2013/0332396 A1 | 12/2013 | Welcker |
| 2013/0339501 A1 | 12/2013 | Haze et al. |
| 2014/0020105 A1 | 1/2014 | Nix et al. |
| 2014/0059236 A1 | 2/2014 | Lo et al. |
| 2014/0108616 A1 | 4/2014 | Haze et al. |
| 2014/0317057 A1 | 10/2014 | O'Connor et al. |
| 2014/0330934 A1 | 11/2014 | O'Connor et al. |
| 2014/0358802 A1 | 12/2014 | Biswas |
| 2015/0089598 A1 | 3/2015 | Keyes et al. |

OTHER PUBLICATIONS

Backup P2P Secured peer to peer backup, http://www.ohloh.net/p/p2pbackupsmile, printed Jun. 18, 2010.

Landers et al., PeerStore: Better Performance by Relaxing in Peer-to-Peer Backup, Fakultät Für Informatik , Technische Universität München, 2004 http://www.computer.org/portal/web/csdl/doi/10.1109/PTP.2004.1334933.

Peer-to-Peer Viral Backup: Cucku 2.0 Definitely Scores Points for Imagination, http://www.fileslinger.com/2009/05/peer-to-peer-viral-backup-cucku-20-definitely-scores-points-forimagination, printed Jun. 18, 2010.

T. Bonkenburg et al, LifeBoat—An Autonomic Backup and Restore Solution, http://www.usenix.org/event/lisa04/tech/full_papers/bonkenburg/bonkenburg.pdf, 2004 LISA XVIII—Nov. 14-19, 2004—Atlanta, GA.

M. Vrable, Cumulus: Filesystem Backup to the Cloud, http://cseweb.ucsd.edu/~voelker/pubs/cumulus-fast09.pdf, Feb. 26, 2009.

L. Mearian, Start-up unveils hybrid cloud/on-site backup service, http://www.itworld.com/storage/64972/start-unveils-hybrid-cloudon-site-backup-service, Mar. 24, 2009.

storage-switzerland.com, Hybrid Cloud Backup for the SMB, http://www.storage-switzerland.com/Articles/Entries/2009/4/24_Hybrid_Cloud_Backup_for_the_SMB.html, Apr. 24, 2009.

M. Staimer, Asigra, Why Cloud Backup/Recovery (Private, Public, or Hybrid) Will be Your Data Protection, http://www.docstoc.com/docs/16851799/Why-Cloud-Backup-Recovery-(Private--Public--or-Hybrid)-WILL-be, printed Jun. 18, 2010.

Cisco License Manager 2.2, http://www.cisco.com/en/US/products/ps7138/index.html, printed Jun. 15, 2010.

Proquest, Sprint and MercuryMD Team Up to Offer Healthcare Providers One-Stop Shopping Opportunity for Mobility Solutions, PR Newswire. New York: Apr. 27, 2004. p. 1; http://proquest.umi.com/pqdweb?did=624136671 &sid=4&Fmt=3&clientId=19649 &RQT =309& VName=POD.

Michigan Retailers Association, Member Services, Electronic Gift Card Processing FAQ, http://www.retailers.com/memberservices/giftcardsfaq.html, printed Apr. 19, 2010.

Yu et al., An adaptive approach to hardware alteration for digital rights management [Online], 2004 [Retrieved: Apr. 28, 2014] Proceedings of the 5th international conference on Information Security Applications (WISA'04), Springer-Verlag, pp. 238-250, [Retrieved from: http://link.springer.com/content/pdf/1 0.1 007%2F978-3-540-31815-6_20.pdf].

Hill, Keith, "A Perspective: The Role of Identifiers in Managing and Protecting Intellectual Property in the Digital Age" [Online], v Jul. 1999 [Retrieved on: Apr. 28, 2014], Proceedings of the IEEE (vol. 87, Issue: 7), pp. 1228-1238, [Retrieved from: http://ieeexplore.ieee.org/stamp/stamp.jsp?tp=&arnumber= 771074].

* cited by examiner

METHOD AND SYSTEM FOR LATE BINDING OF OPTION FEATURES ASSOCIATED WITH A DEVICE USING AT LEAST IN PART LICENSE AND UNIQUE ID INFORMATION

BACKGROUND OF THE INVENTION

Field of the Invention

The present invention relates to the management of information handling systems. More specifically, embodiments of the invention provide a system, method, and computer-readable medium for entitling the implementation of a feature associated with a device after it is manufactured.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, it is difficult to implement features associated with a device (e.g., computer systems, peripherals, communications equipment, etc.) once it has been manufactured. Instead, features generally have to be implemented at the time of manufacture. As a result, implementing a feature for a device typically requires a service call where a hardware feature is added or exchanged, or alternatively, the assistance of an administrator or service agent to implement software and service features.

Known approaches to this issue include having a manufacturer or vendor include additional features in a device at time of manufacture. However, these features are then disabled and require the implementation of a digital key to implement them at a later time. In some cases, these approaches require a service person to make an onsite visit to implement the feature. In other cases, the feature may be implemented through the use of a hardware management system. It will be appreciated that such approaches may not be as efficient or cost-effective as desired. In view of the foregoing, there is a need for a more effective way of managing the implementation of a feature associated with a device after it is manufactured.

SUMMARY OF THE INVENTION

A system, method, and computer-readable medium are disclosed tier entitling the implementation of a feature associated with a device after it is manufactured. In various embodiments, the device comprises a unique device identifier, which in turn comprises the unique identifiers of predetermined device components. In these and other embodiments, a feature entitlement management system receives a device's unique device identifier, which is used to authenticate the device.

The feature entitlement management system then uses the device's unique device identifier, along with current feature status and other operational information, to determine which features associated with the device are available for implementation. Once the feature entitlement management system determines which features are available for implementation, they are provided to the user of the device.

If the user decides to implement an available feature, then it is selected. A feature entitlement is then generated by performing late binding entitlement operations to associate the selected feature's corresponding entitlement data (e.g., purchase information, license information, etc.) with device, account and other predetermined data associated with the device. The resulting feature entitlement is then added to a feature entitlement record, likewise associated with the device, in turn, the feature entitlement is processed to implement the selected and available feature associated with the device. In one embodiment, the feature entitlement is processed by a personalization agent associated with the device.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for entitling the implementation of a feature associated with a device after it is manufactured. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
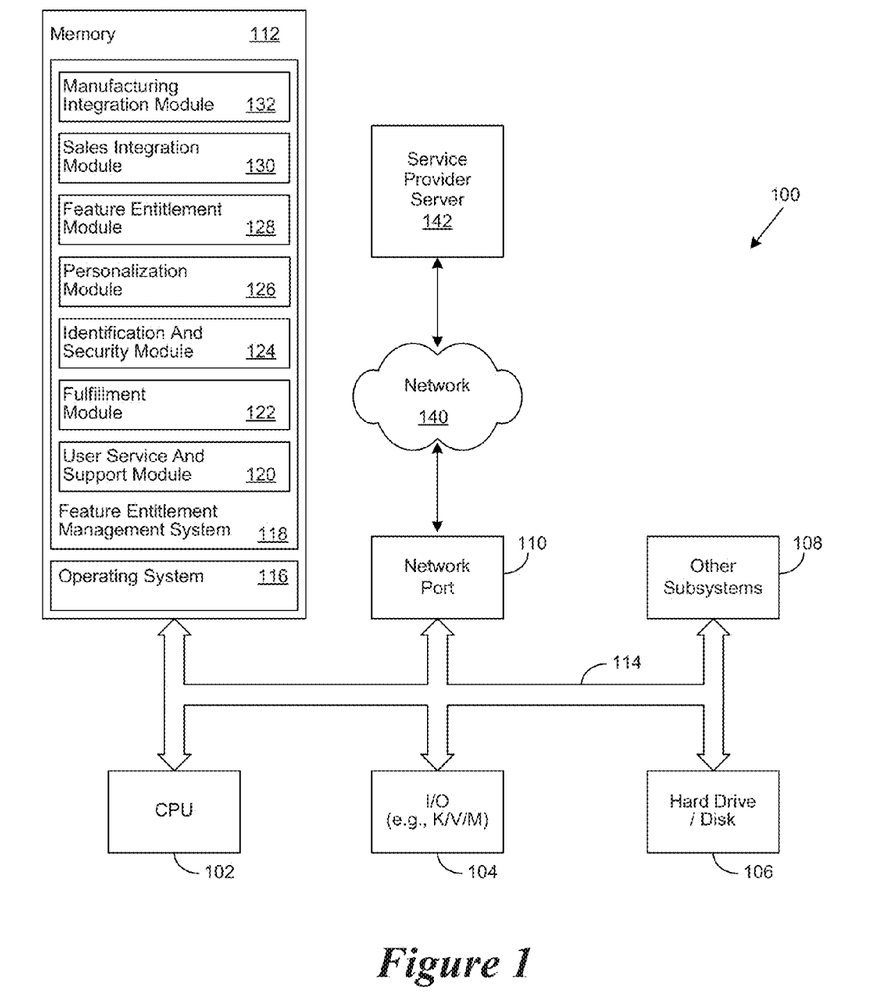
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a feature entitlement management system 118. In these and other embodiments, the feature entitlement management system 118 may likewise comprise a user service and support module 120, a fulfillment module 122, an identification and security module 124, a personalization module, a feature entitlement module 128, a sales integration module, and a manufacturing integration module 132. In one embodiment, the information handling system 100 is able to download the feature entitlement management system 118 from the service provider server 142. In another embodiment, the feature entitlement management system 118 is provided as a service from the service provider server 142.

Figure 2:
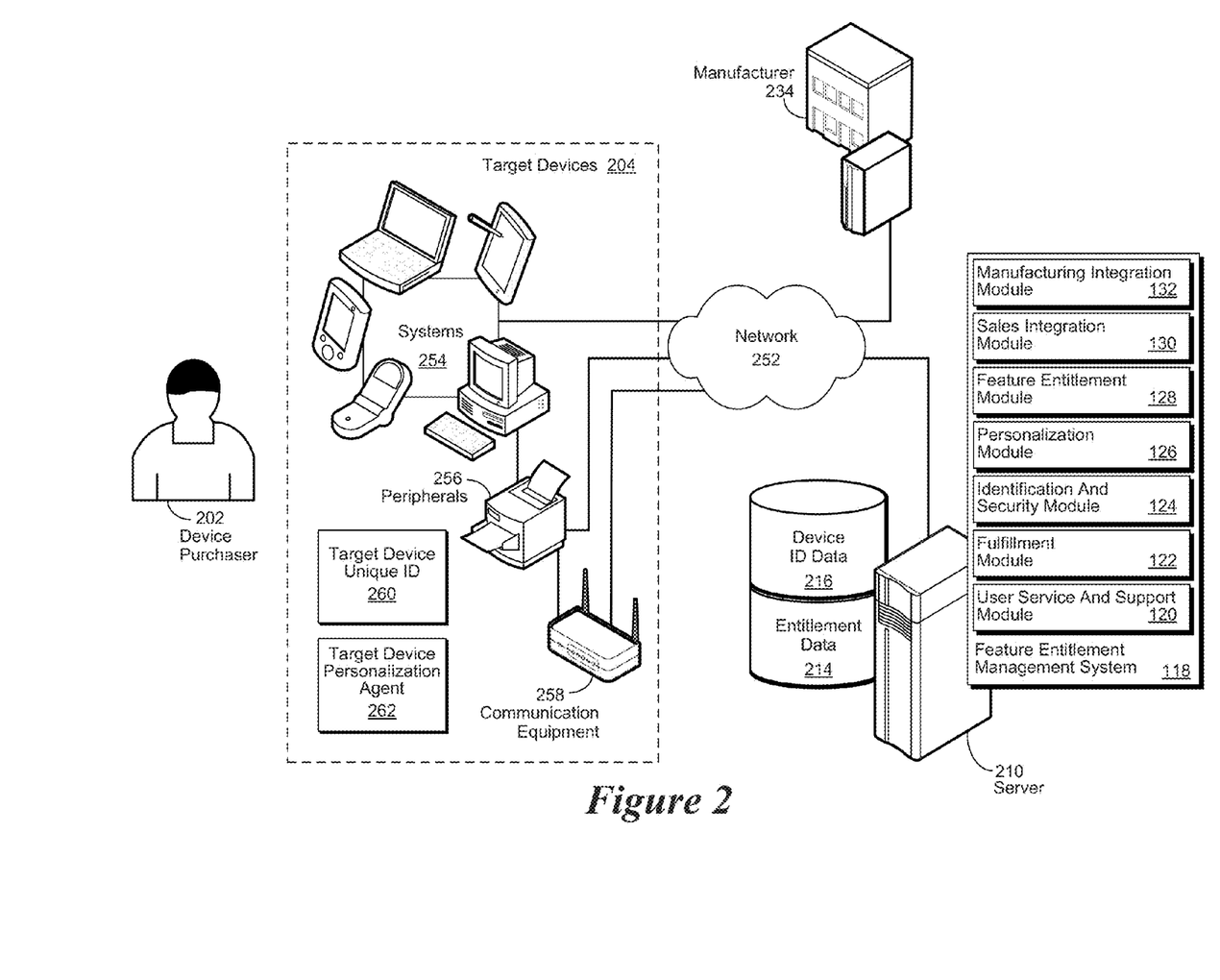
FIG. 2 is a simplified block diagram of the performance of late binding feature entitlement operations.

FIG. 2 is a simplified block diagram of the performance of late binding feature entitlement operations as implemented in accordance with an embodiment of the invention. In various embodiments, a feature entitlement management system 118 is implemented for entitling the implementation of a feature associated with a target device 204 after it is manufactured. As used herein, a target device 204 broadly refers to any apparatus operable to receive, process, store, provide or communicate data. In these various embodiments, the target device 204 may comprise a system 254 device, a peripheral 256 device, or a communications equipment 258 device.

In various embodiments a system 254 device may comprise a personal computer, a laptop computer, a tablet computer, a personal digital assistant (PDA), a mobile telephone, etc., operable to establish an on-line session with the feature entitlement management system 118 over a connection to network 252. Likewise, a peripheral 256 device may comprise a printer, scanner, etc., and a communications equipment 258 device may comprise a switch, router, etc., also operable to establish an on-line session with the feature entitlement management system 118 over a connection to network 252.

In these and other embodiments, the target devices 204 are likewise operable to store a unique target device ID 260 and to perform feature entitlement management operations with a target device personalization agent 262. In one embodiment, a peripheral 256 device is operably connected to a system 254 device. In another embodiment, a peripheral 256 device is operably connected to a communications equipment 258 device. In yet another embodiment, the communications equipment 258 device is connected to a system 254 device. In still yet another device, a peripheral 256 device is operably connected to the network 254. Skilled practitioners of the art will recognize that many such embodiments are possible and the foregoing is not intended to limit the spirit, scope or intent of the invention.

As likewise used herein, a feature broadly refers a distinguishing feature associated with the target device 204 that can be implemented either directly or indirectly. In various embodiments, the distinguishing feature may be a hardware feature, a software feature, or a service feature. As an example, the manufacturer 234 may choose to ship a multi-band configurable radio in the device 204, such as a dual-band 802.11n radio. It will be appreciated that such hardware is typically more expensive than a single-band 802.11n radio, but the complexity cost of offering two single-band radios, one configured for 2.4 Ghz and the other configured for 5 Ghz, may also be too great. In this example, the manufacturer 234 might sell 802.11n 2.4 Ghz, but leave the 802.11n 5 Ghz switched off, with a license key being required to enable or disable the feature. To further the example, a user (e.g., device purchaser 202) may purchase the device 204 with the 802.11n 5 Ghz feature disabled through a corresponding feature entitlement. Should the user elect to implement the 802.11n on 5 Ghz feature enabled, then a corresponding feature entitlement is generated as described in greater detail herein. Once the feature entitlement is generated, then its corresponding entitlement data is processed by the target device's associated personalization agent 262 to implement the feature. In one embodiment, the target device's associated personalization agent 262 is embedded in the target device 204 itself. In another embodiment, the target device's associated personalization agent 262 may reside on a different target device 204, such as a system 254 device, a peripheral 256 device, or a communications equipment 258 device.

As another example, a printer (peripheral device 256) may be manufactured with an integrated duplexer, yet its functionality has initially been disabled. To implement the duplexer feature of the printer, the device purchaser 202 may elect to pay an additional fee, which would result in the generation of a feature entitlement, as described in greater detail herein. However, it will be appreciated that implementing the duplexer feature would likely increase the service cost and the likelihood of a service call. As a result, this potential financial and operational liability could be offset by presenting the device purchaser 202 the opportunity to purchase a warranty or service policy, which would be presented as a service feature. Purchasing such a service feature associated with the target device e.g., printer device 256) would result in the generation of an additional feature entitlement. Likewise, another available feature may be an offer to automatically place an order for printer cartridges when their toner or ink levels reach a predetermined level.

As yet another example, a software application installed on a target device 204 may have certain modules or capabilities installed, yet they are likewise disabled. As another example, a service, such as a cloud-based data backup service, may be preconfigured for a target device 204, but also be disabled. In these various embodiments, the processing of a feature entitlement by the feature entitlement management system 118 results in the hardware, software or service feature being implemented. Those of skill in the art will recognize that many such embodiments are possible and the foregoing is not intended to limit the spirit, scope or intent of the invention.

As shown in FIG. 2, the feature entitlement management system 118 comprises a user service and support module 120, a fulfillment module 122, and a system identification and security module 124. The feature entitlement management system 118 likewise comprises a personalization module 126, a feature entitlement module 128, a sales integration module 130, and a manufacturing integration module 132. Likewise, the feature entitlement management system 118 is able to access an entitlement data repository 214 and a device identifier (ID) data repository 216, either of which may be implemented on one or more servers 210 connected to a network 252. In certain embodiments, the feature entitlement management system 118 may likewise be implemented on one or more servers 210, which are connected to a network 252. In various embodiments, the network 252 may comprise a public network, such as the Internet, a physical private network, a virtual private network (VPN), or any combination thereof.

As used herein, a feature entitlement refers to the right of a target device 204 which is respectively identified by a corresponding unique target device identifier 260, to implement an associated feature. In various embodiments, a feature entitlement record contains entitlement data (e.g., purchase information, etc.) that allows a feature associated with the target device 204 to be implemented. In these and other embodiments, the feature entitlement record is processed by the feature entitlement module 128 and stored in the entitlement data repository 214.

In various embodiments, feature entitlement and device personalization operations are performed by a user, such as a device purchaser 202, in on-line environment. As an example, an on-line environment may comprise a system manufacturer 234 that accepts on-line orders for systems or devices over a connection to network 252.

In these and other embodiments, the device purchaser 202 decides whether to purchase a custom-configured or pre-configured target device 204. If the target device 204 is pre-configured, then it is selected for on-line purchase by the device purchaser 202 and its unique target device identifier 260 is determined. In one embodiment, the unique target device identifier 260 is stored in the BIOS of the pre-configured target device 204. However, if the target device 204 is to be custom-configured, then it is custom-configured on-line by the device purchaser 202. Once manufactured by the system manufacturer 234, a unique target device identifier 260 is generated as described in greater detail herein.

In various embodiments, the manufacturing integration module 132 coordinates the custom configuration of the target device 204 with the system manufacturer 234. Likewise, the system identification and security module 124 coordinates the generation of the unique target device identifier 260 and its storage in the repository of device identifier data 216. The device purchaser 202 then selects one or more features for on-line purchase, followed by selecting personalization options for the pre-configured or custom-configured target device 204. In various embodiments, the personalization module 126 coordinates the selection of personalization options with the system manufacturer 234. As used herein, a device personalization option refers to any feature, capability, or function that may be applied to a target device 204. As an example, a personal computer desktop wallpaper or user interface options (e.g., a "classic" interface) are personalization options. A purchase transaction for the custom-configured or pre-configured target device 204, and any associated features and personalization options is then completed. In various embodiments, the processing of the purchase transaction is performed by the sales integration module 130.

Feature entitlement operations, as described in greater detail herein, are then performed by the feature entitlement management system 118 to bind the features, the personalization options, and their respective entitlement data to the unique target device identifier 260. The resulting feature entitlements, including data associated with the features or personalization options (e.g., installation files, drivers, etc.) is then stored in the repository of entitlement data 214. The custom-configured or pre-configured target device 204 or target 260 device is then delivered to the device purchaser 202. In various embodiments, the feature entitlement module 128 generates, and then processes, the entitlement data and the user service and support module 120 coordinates the delivery of the target device 204 to the device purchaser 202.

Standard operating system (OS) out-of-the-box-experience (OOBE) or hypervisor boot operations are performed on the target 204 device, followed by activating the target device personalization agent 262. In various embodiments, the target device personalization agent 262 has a unique identifier that is associated with one or more unique system device identifiers. In one embodiment, the unique identifier of the target device personalization agent 262 is uniquely associated with the current unique target device identifier 260 associated with the target device 204. In another embodiment, a portion of the target device personalization agent 262 is delivered to the target device 204 in an encrypted form and is then decrypted prior to being loaded on the target device 204. In this embodiment, the primary system identifier (e.g., service tag number, serial number, etc.), is used as a decryption key to decrypt the target device personalization agent 262.

In various embodiments, secondary device identifiers are stored on the target device 204 (e.g., in the BIOS, in Flash memory, on a hard disk, etc.) as well as in the feature entitlement management system 118. In these and other embodiments, the feature entitlement management system 118 uses the secondary device identifiers to encrypt a portion of the target device personalization agent 262 before it is loaded onto the target device 204. Once activated, the unencrypted portion of the target device personalization agent 262 uses the secondary device identifiers stored on the target device 204 to decrypt the encrypted portion of the target device personalization agent 262. In one embodiment, the secondary device identifiers are likewise encrypted and are first decrypted before they are used to decrypt the encrypted portion of the target device personalization agent 262. In another embodiment, the secondary device identifiers are stored in a Trusted Platform Module (TPM). Skilled practitioners of the art will recognize that many such embodiments are possible and the foregoing is not intended to limit the spirit, scope, or intent of the invention.

In various embodiments, features associated with a target device 204 are implemented after it is manufactured or after its delivery to a user, such as the device purchaser 202. In these and other embodiments, the implementation of these associated features is accomplished through the performance of late binding entitlement operations, which result in the generation of feature entitlements that entitle the implementation of features associated with the target device 204 after it is manufactured.

In certain embodiments, late binding feature entitlement operations are begun by a target device's embedded personalization agent 262 first determining the target device's unique identifier 260. In various embodiments, the unique device identifier 260 associated with the target device 204 is stored in its BIOS, flash memory, a hard disk, or other memory device. The target device's personalization agent 262 then automatically establishes a connection with the feature management entitlement system 118 and uses the target device's unique identifier 260 to authenticate it to the feature entitlement management system 118.

The target device's personalization agent 262 then provides implemented feature status and other operational information related to the target device 204 to the feature entitlement management system 118. In turn, the feature entitlement management system 118 uses the target device's unique device identifier 260 and the provided feature status and other operational information to determine features associated with the target device 204 that are available for implementation. Once the feature entitlement management system 118 determines the features associated with the target device 204 that are available for implementation, they are provided to the target device's personalization agent 262. In turn, the personalization provides a list of the associated features available for implementation to the user (e.g., device purchaser 202) of the target device 204.

If the user decides to implement an available feature, then it is selected and a feature entitlement is generated by performing late binding entitlement operations, as described in greater detail herein, to associate the selected feature's corresponding entitlement data (e.g., purchase information, license information, etc.) with the target device's 204 associated device record, account record, and other predetermined records. The resulting feature entitlement is then added to the feature entitlement record, as likewise described in greater detail herein. In one embodiment, the feature entitlement record is stored in the repository of entitlement data 214. The feature entitlement is then processed by a target device personalization agent 262 associated with the target device 204 to implement the selected and available feature.

Figure 3A:
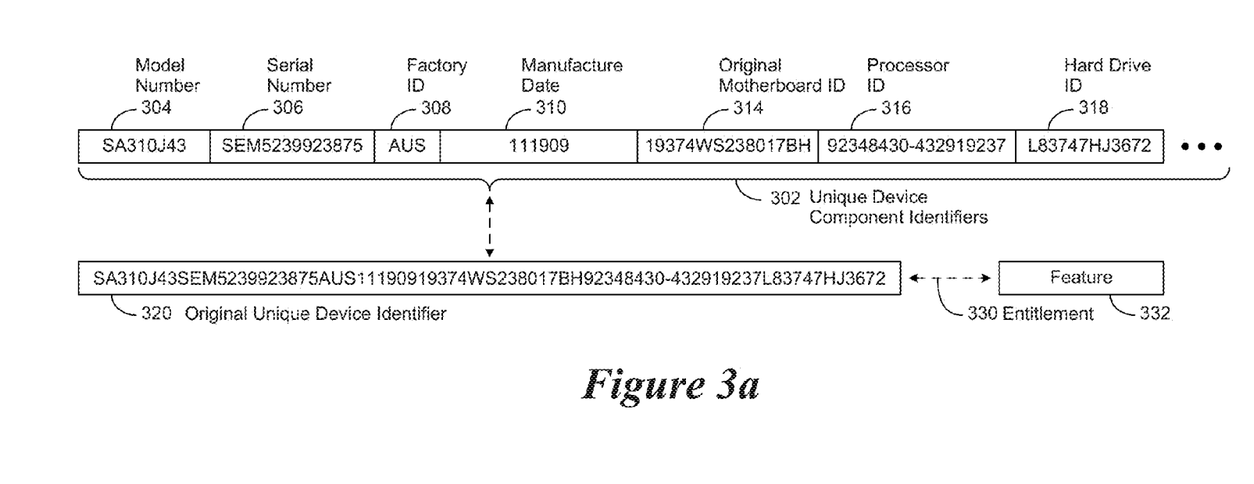
FIGS. 3a-b are a simplified block diagram of a unique device identifier that remains the same when one of its associated device component identifiers has been changed.
Figure 3B:
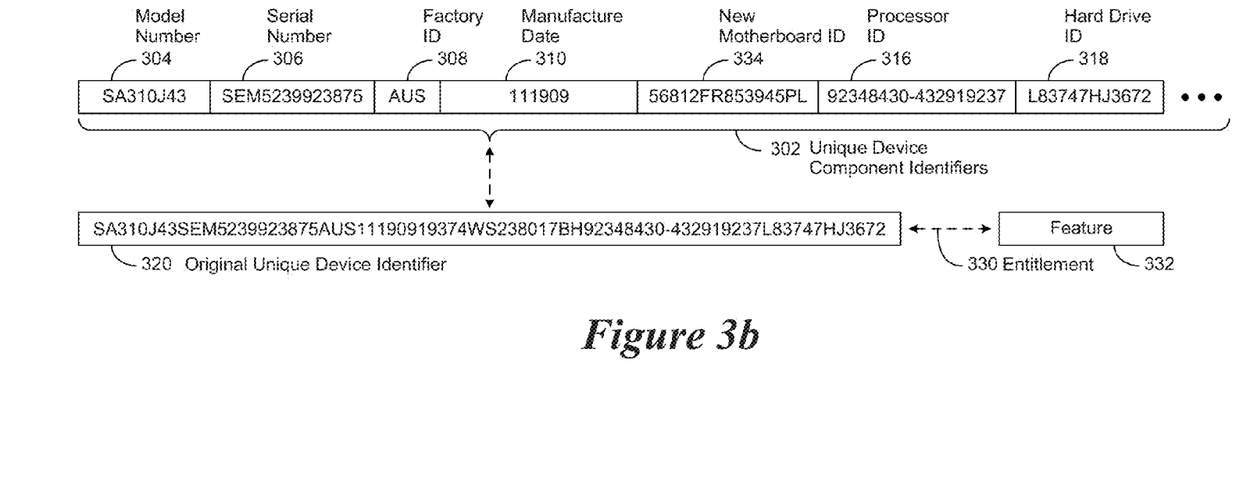

FIGS. 3a-b are a simplified block diagram of a unique device identifier that remains the same when one of its associated device component identifiers has been changed in accordance with an embodiment of the invention. As shown in FIG. 3a, an original unique device identifier 320 is generated from a plurality of unique device component identifiers 302, which correspond to a plurality of device components contained in a target system. As likewise shown in FIG. 3a, the unique device component identifiers 302 comprise a Model Number 304 'SA310J43, a Serial Number 306, sometimes referred to as a service tag number or a primary system identifier, 'SEM5239923875', a Factory ID 308 'AUS', and a Manufacture Date 310 '111909'. The unique system device component identifiers 302 likewise comprise an Original Motherboard ID 314 '19374WS238017BH' a Processor ID 316 '92348430-432919237', a Hard Drive ID 318 'L83747HJ3672', etc.

As described in greater detail herein, once generated, the original unique device identifier 320 is associated, such as through a binding operation, with a predetermined feature 332 to generate a feature entitlement 330. As likewise described in greater detail herein, the feature entitlement 330 entitles a target device, which is associated with the original unique device identifier 320, to implement the feature 332. However, it is not uncommon for device components to be replaced due to failure, erratic performance, becoming outmoded, or for other reasons. It will be appreciated that the entitlement 330 between the original unique device identifier 320 and the feature 332 may be compromised as a result of such a replacement. For example, as illustrated in FIG. 3b, the Original Motherboard ID 314 '19374WS238017BH' has been replaced with a New Motherboard ID 334 '56812FR853945PL'. However, the original unique device identifier 320 remains unchanged.

In various embodiments, extract, transform, and load (ETL) and other database operations are performed to manage the integrity of the relationship between the original unique device identifier 320 and the plurality of unique device component identifiers 302. As an example, the Original Motherboard ID 314 '19374WS238017BH' may remain as a subset of the original unique device identifier 320, even though it may have been deactivated or invalidated as one of the unique device component identifiers 302. However, in these and other embodiments, relational database operations known to those of skill in the art may be applied to maintain the relationship between the original unique device identifier 320, the New Original Motherboard ID 334 '56812FR853945PL', and the unchanged unique device component identifiers 302. Accordingly, the integrity of the entitlement 330 between the original unique device identifier 320 and the feature 332 is perpetuated. It will be apparent to skilled practitioners of the art that many such embodiments are possible and the foregoing is not intended to limit the spirit, scope, or intent of the invention.

Figure 4A:
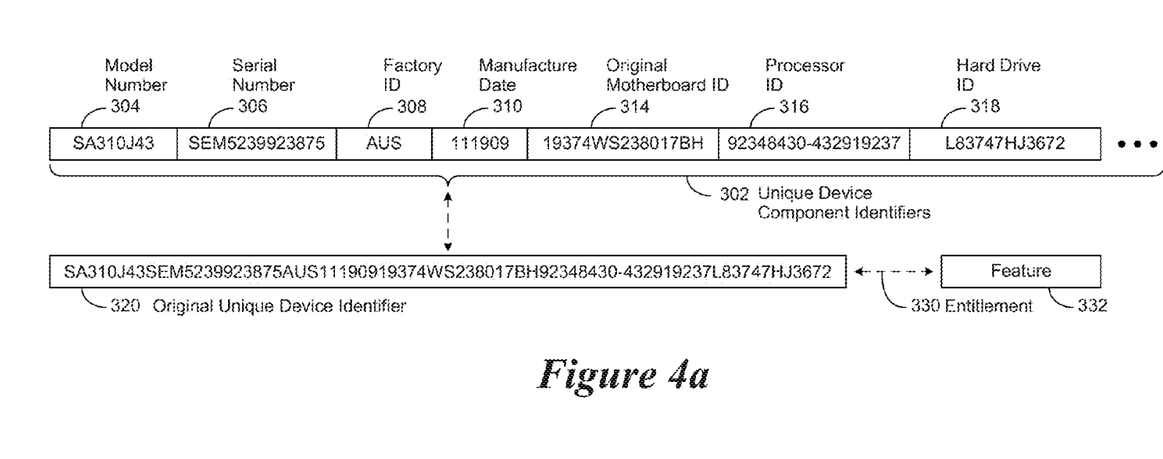
FIGS. 4a-b are a simplified block diagram of a unique device identifier that is changed when one of its associated device component identifiers has been changed.
Figure 4B:
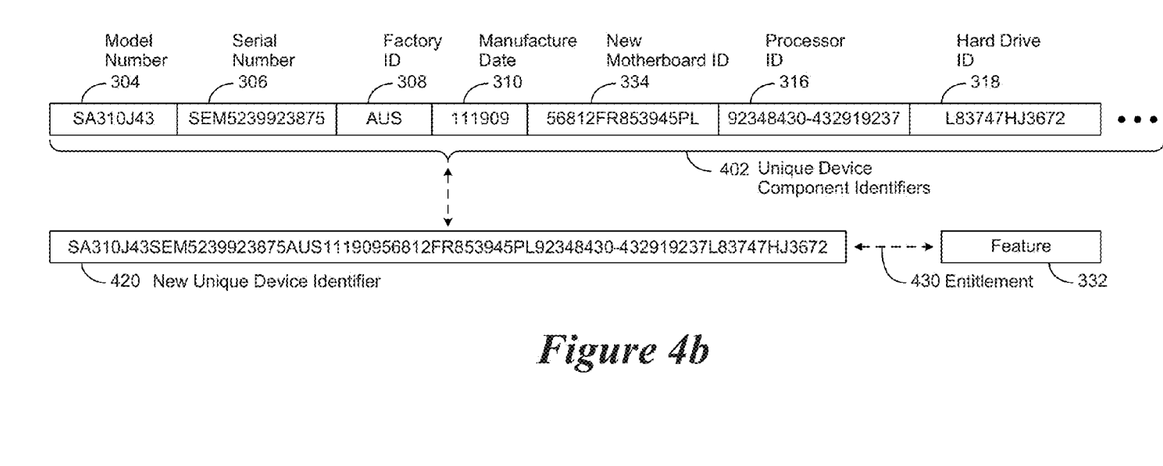

FIGS. 4a-b are a simplified block diagram of a unique device identifier that is changed when one of its associated device component identifiers has been changed in accordance with an embodiment of the invention. As shown in FIG. 4a, an original unique device identifier 320 is generated from a plurality of unique device component identifiers 302, which correspond to a plurality of device components contained in a target device. As likewise shown in FIG. 3a, the unique device component identifiers 302 comprise a Model Number 304 'SA310J43, a Serial Number 306, sometimes referred to as a service tag number or a primary system identifier, 'SEM5239923875', a Factory ID 308 'AUS', and a Manufacture Date 310 '111909'. The unique device component identifiers 302 likewise comprise an Original Motherboard ID 314 '19374WS238017BH', a Processor ID 316 '92348430-432919237', a Hard Drive ID 318 'L83747HJ3672', etc.

As described in greater detail herein, once generated, the original unique device identifier 320 is associated, such as through a binding operation, with predetermined feature 332 to generate a feature entitlement 330. As likewise described in greater detail herein, the feature entitlement 330 entitles a target device, which is associated with the original unique device identifier 320, to implement the feature 332. However, it is not uncommon for device components to be replaced due to failure, erratic performance, becoming outmoded, or for other reasons. It will be appreciated that the feature entitlement 330 between the original unique device identifier 320 and the feature 332 may be compromised as a result of such a replacement. For example, as illustrated in FIG. 4b, the Original Motherboard ID 314 '19374WS238017BH' has been replaced with a New Motherboard ID 334 '56812FR853945PL'. As a result, a new unique device identifier 420 is generated, which is a concatenation of the plurality of unique device component identifiers 402, including the New Original Motherboard ID 334 '56812FR853945PL' as a subset. In certain embodiments, such as when an old system is replaced with an entirely new system, none of the unique device component identifiers 402 associated with the new unique device identifier 420 are the same as the unique device component identifiers 302 associated with the original unique device identifier 320.

In various embodiments, a first set of operations are performed to remove the feature entitlement 330 between the original unique device identifier 320 and feature 332. A second set of operations are then performed to associate the new unique device identifier 420 with the feature 332 to generate a new feature entitlement 430. In these and other embodiments, the original unique device identifier 320 is then invalidated. Accordingly, the integrity of the original feature entitlement 330 between the original unique device identifier 320 and the feature 332 is perpetuated by the new feature entitlement 430 between the new unique device identifier 420 and the feature 332. In certain embodiments, an old system comprising an original unique device identifier 320 is replaced with an entirely new device comprising a new unique device identifier 420. In these and other embodiments, the generation of a new feature entitlement 430 and the invalidation of the original unique device identifier 320 migrates the entitlement of the feature 332 from the old device to the new device. Skilled practitioners of the art will recognize that many such embodiments are possible and the foregoing is not intended to limit the spirit, scope, or intent of the invention.

Figure 5:
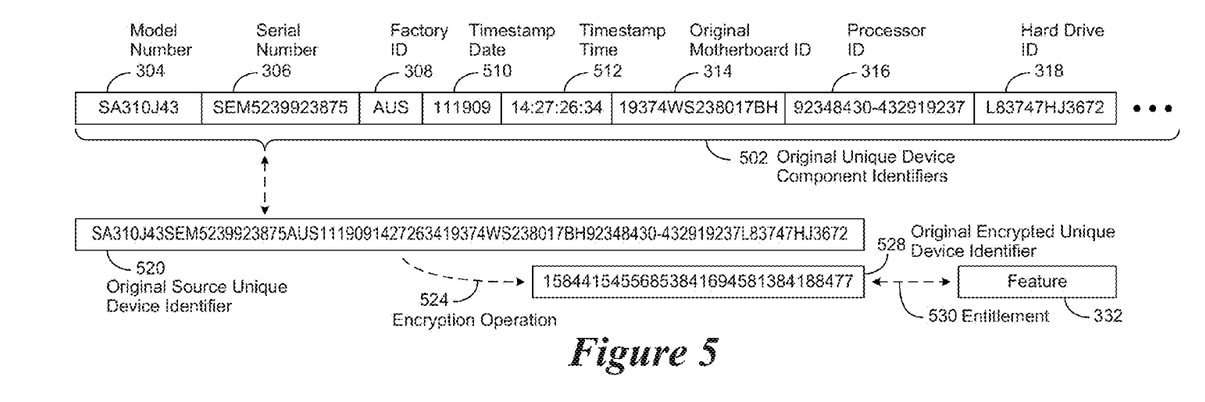
FIG. 5 is a simplified block diagram of an encrypted unique device identifier generated from a set of device component identifiers.

FIG. 5 is a simplified block diagram of an encrypted unique device identifier generated from a set of device component identifiers in accordance with an embodiment of the invention. In this embodiment, a source unique device identifier 520 is generated from a plurality of original unique device component identifiers 502, which correspond to a plurality of device components contained in a target system. As shown in FIG. 5, the original unique device component identifiers 502 comprise a Model Number 304 'SA310J43, a Serial Number 306, sometimes referred to as a service tag number or a primary system identifier, 'SEM5239923875', a Factory ID 308 'AUS', a Timestamp Date 510 '111909', and a Timestamp Time 512 '14:27:26:34'. The original unique device component identifiers 502 likewise comprise an Original Motherboard ID 314 '19374WS238017BH', a Processor ID 316 '92348430-432919237', a Hard Drive ID 318 'L83747HJ3672', etc.

An encryption operation 524 is then performed on the source unique device identifier 520 to generate an original encrypted unique device identifier 528. In various embodiments, the encryption operation may comprise the use of a private key, a public key, key pairs, or any combination of keys and cryptographic operations such as implemented in a public key infrastructure (PKI). As an example, the original encrypted unique device identifier 528 may be generated using a private key associated with the manufacturer of the system and a public key associated with the system itself. In one embodiment, the Timestamp Date 510 '111909' and the Timestamp Time 512 '14:27:26:34' are likewise used to generate the encrypted unique device identifier 528. Skilled practitioners of the art will be familiar with such cryptographic operations and recognize that many such embodiments are possible and that the foregoing is not intended to limit the spirit, scope, or intent of the invention.

As described in greater detail herein, once generated, the original encrypted unique device identifier 528 is associated, such as through a binding operation, with predetermined feature 332 to generate a feature entitlement 530. As likewise described in greater detail herein, the feature entitlement 530 entitles a target device, which is associated with the original encrypted unique device identifier 528, to implement the feature 332.

Figure 6:
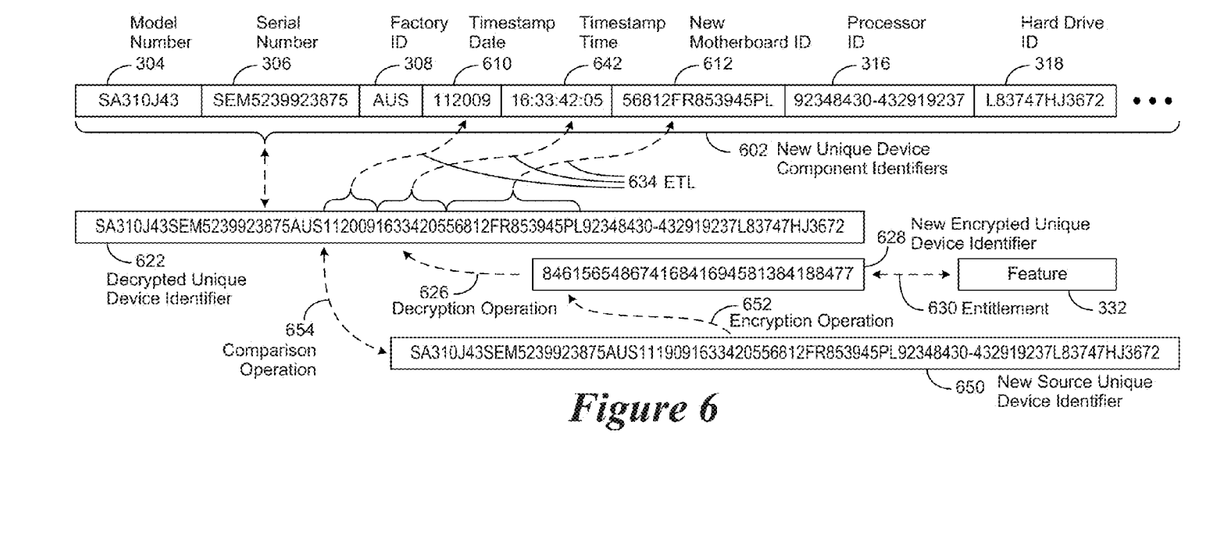
FIG. 6 is a simplified block diagram of a unique device identifier decrypted from an encrypted unique device identifier.

FIG. 6 is a simplified block diagram of a unique device identifier decrypted from an encrypted unique device identifier in accordance with an embodiment of the invention. It is not uncommon for device components to be replaced due to failure, erratic performance, becoming outmoded, or for other reasons. However, the replaced device component will typically have a different unique device identifier. As a result, the entitlement association between a unique device identifier and a predetermined feature may be compromised as a result of such a replacement, which in turn may prevent the target device from implementing the feature.

In various embodiments, the unique device component identifier of the replacement system component is unknown until it is replaced in the target system. In these and other embodiments, the system component is replaced in the target system, the target system is then initiated (e.g., booted), and an inventory of unique system device identifiers is performed. In one embodiment, one or more unique system device identifiers, such as a serial number or service tag, are visible and may be visually inventoried. In another embodiment, one or more unique system device identifiers, such as a motherboard, processor, or hard drive serial number, are not visible and may be automatically inventoried.

As shown in FIG. 6, a new source unique device identifier 650 is generated from the inventoried unique system device identifiers. In one embodiment, a time stamp date and a time stamp time are components of the new source unique device identifier 650. In this embodiment, the time stamp date and a time stamp time are used to validate the authenticity of the new source unique device identifier 650. As an example, the provider of the replacement part may have stipulated that the replacement part be replaced on Nov. 12, 2009, between 8:00 AM and 6:00 PM. Accordingly, a time state date of Nov. 12, 2009 and a time stamp time of 16:33:42:05 would provide validation that the replacement part was replaced within the specified date and time interval.

An encryption operation 652 is then performed on the new source unique device identifier 650 to generate a new encrypted unique device identifier 628. As an example, the encryption operation may be performed using a private key associated with the target system and a public key associated with the provider of the replacement system component. The new encrypted unique device identifier 628 is then communicated to a feature entitlement management system, which in turn performs a decryption operation 626 to generate a decrypted unique device identifier 622.

As likewise shown in FIG. 6, extract, transform, and load (Elf) and other database operations 634 are performed on the decrypted unique device identifier 622 to generate new unique device component identifiers 602. As shown in FIG. 6, the new unique system device identifiers now comprise a Model Number 304 'SA310J43, a Serial Number 306, 'SEM5239923875', a Factory ID 308 'AUS', a Timestamp Date 610 '112009', and a Timestamp Time 612 '16:33:42:05'. The new unique device component identifiers 602 likewise comprise a New Motherboard ID 314 '56812FR853945PL', a Processor ID 316 '92348430-432919237', a Hard Drive ID 318 'L83747HJ3672', etc. In one embodiment, the Timestamp Date 610 and the Timestamp Time 612 are compared to previously authorized timestamp date and timestamp times to validate the authenticity of the new unique device component identifiers 602 and their corresponding decrypted unique device identifier 622. In this and other embodiments, if the decrypted unique device identifier 622 is validated, then a first set of operations are performed to remove the entitlement between the original encrypted unique device identifier and feature 332. A second set of operations are then performed to associate the new encrypted unique device identifier 628 with the feature 332 to generate anew entitlement 630. Accordingly, the integrity of the original entitlement between the original encrypted unique device identifier and the feature 332 is perpetuated by the new entitlement 630 between the new encrypted unique device identifier 628 and the feature 332.

In various other embodiments, the provider of the replacement system component is able to determine its associated unique device component identifier. In one embodiment, the unique device component identifier is known in advance, in another embodiment, the unique device component identifier may be one of a pool of, or a range of, possible unique system device identifiers set aside for replacement purposes. As described in greater detail herein, anew source unique identifier is generated, using the unique device component identifier of the component to be replaced. Once the new source unique identifier is generated the unique device component identifier of the replaced system component is invalidated. In these and other embodiments, the system component is replaced in the target system, the target system is then initiated (e.g., booted), and an inventory of unique system device identifiers is performed. In one embodiment, one or more unique system device identifiers, such as a serial number or service tag, are visible and may be visually inventoried. In another embodiment, one or more unique system device identifiers, such as a motherboard, processor, or hard drive serial number, are not visible and may be automatically inventoried.

As shown in FIG. 6, a new source unique device identifier 650 is generated from the inventoried unique system device identifiers. In one embodiment, a time stamp date and a time stamp time are components of the new source unique device identifier 650. In this embodiment, the time stamp date and a time stamp time are used to validate the authenticity of the new source unique device identifier 650. An encryption operation 652 is then performed on the new source unique device identifier 650 to generate anew encrypted unique device identifier 628. As an example, the encryption operation may be performed using a private key associated with the target system and a public key associated with the provider of the replacement system component. The new encrypted unique device identifier 628 is then communicated to a feature entitlement management system, which in turn performs a decryption operation 626 to generate a decrypted unique device identifier 622.

Comparison operations 654 are then performed between the new source unique device identifier and the decrypted unique device identifier 622. If the comparison operations 654 are successful, then a first set of operations are performed to remove the entitlement between the original encrypted unique device identifier and feature 332. A second set of operations are then performed to associate the new encrypted unique device identifier 628 with the feature 332 to generate a new entitlement 630. Accordingly, the integrity of the original entitlement between the original encrypted unique device identifier and the feature 332 is perpetuated by the new entitlement 630 between the new encrypted unique device identifier 628 and the feature 332. Skilled practitioners of the art will recognize that many such embodiments are possible and the foregoing is not intended to limit the spirit, scope, or intent of the invention.

Figure 7A:
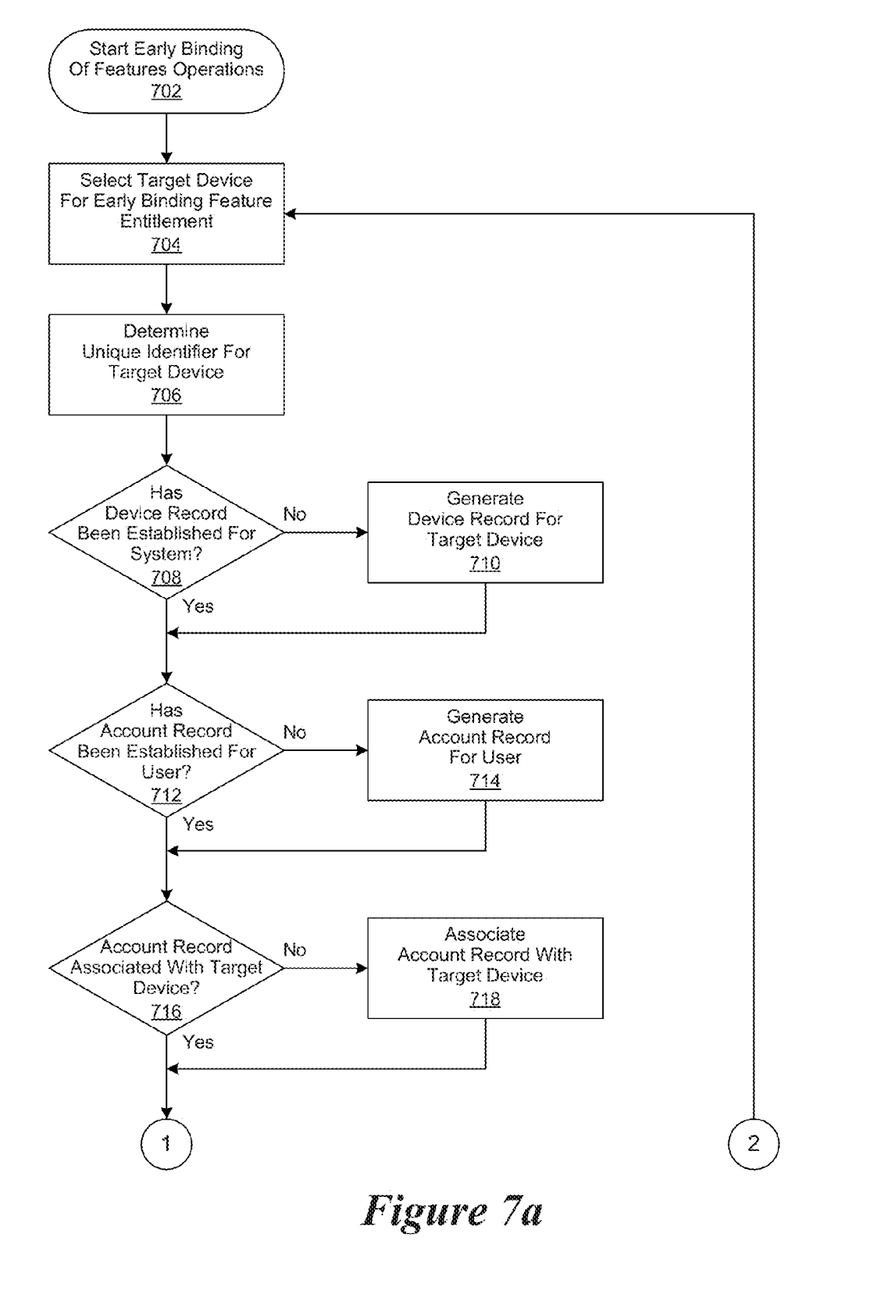
FIGS. 7a-b are a generalized flow chart of the performance of early binding feature entitlement operations.
Figure 7B:
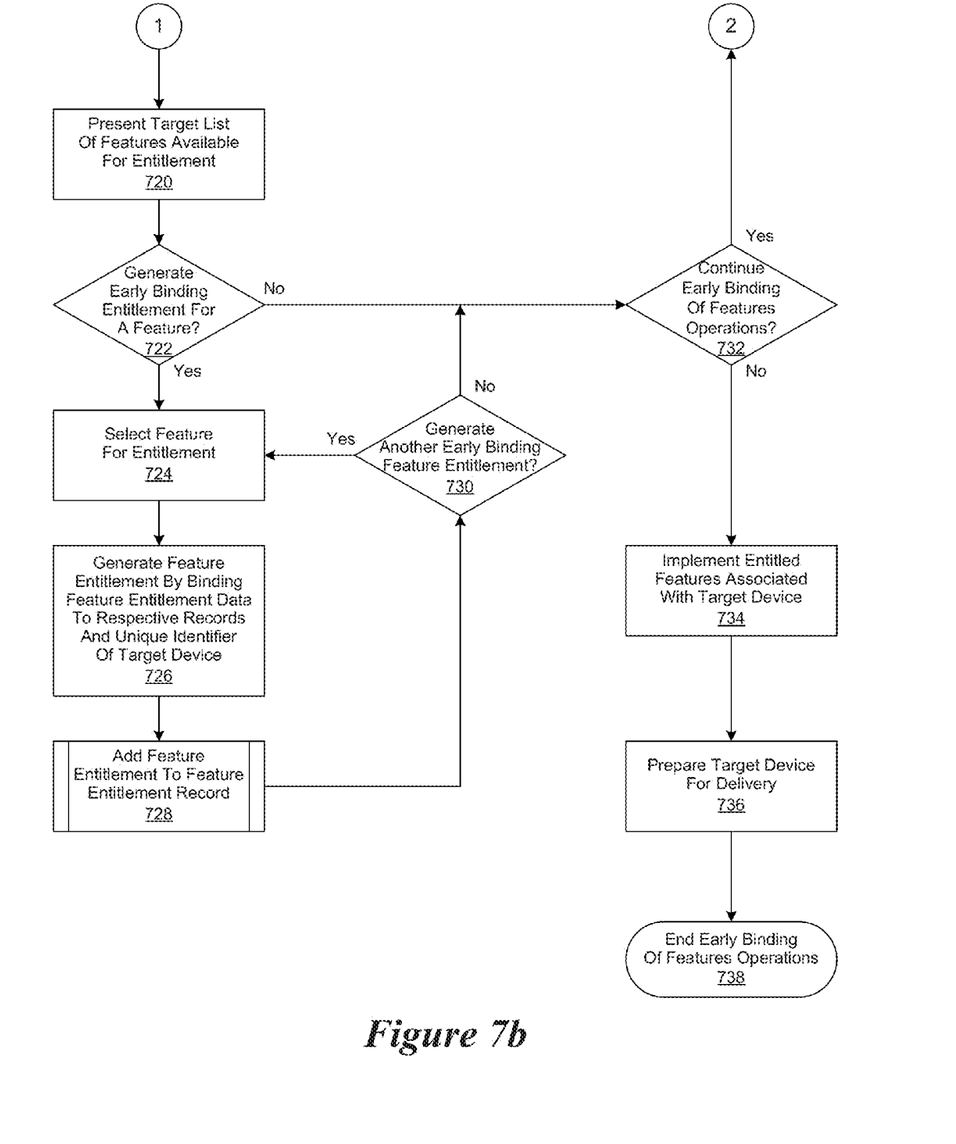

FIGS. 7a-b are a generalized flow chart of the performance of early binding feature entitlement operations as implemented in accordance with an embodiment of the invention. In various embodiments, features associated with a target device are implemented while it is being manufactured or prior to its delivery to a user. In these and other embodiments, the implementation of these associated features is accomplished through the performance of early binding entitlement operations, which generate feature entitlements that entitle the target device to implement the associated feature.

In this embodiment, early binding feature entitlement operations are begun in step 702, followed by the selection of a target device in step 704 for feature entitlement. The unique device identifier of the target device, as described in greater detail herein, is determined in step 706, followed by a determination being made in step 708 whether a device record has been established for the target device. If not, then the device record is generated in step 710. As used herein, a device record refers to a data record containing data related to a target device, which in various embodiments is entitled to implement an associated feature once a corresponding entitlement, as described in greater detail herein, has been generated. In various embodiments, the unique device identifier of the target device is stored in the device record. In various embodiments, other records may be associated with the device record to further describe the device, such as its model, type, make, internal identifiers, etc.

Once the device record has been generated, or if it is determined in step 708 that it has already been established, then a determination is made in step 712 whether an account record has been established for a user. If not, then the account record is generated for the user in step 714. As used herein, an account record refers to a data record containing data related to the association one or more devices to one or more entities. In various embodiments, the entity may be a single individual or a group of individuals. As an example, the entity may be a household with multiple system, peripheral, or communication equipment devices, a small business with several employees, a large corporation with many employees, etc. Other records may be attached to the account to further describe the account holder, payment information related to the account, etc. Accounts may further be broken down or organized into sub-accounts as needed, such as to describe departments within an enterprise. In various embodiments, a user may be associated with one or more devices within the account record. Conversely, a group of users may be associated with one or more devices in the account record. Furthermore, groups of individual users may likewise be associated with groups of individual devices. Those of skill in the art will recognize that many such associations are possible and the foregoing is not intended to limit the spirit, scope, or intent of the invention. Once the account record has been generated, or if it is determined in step 712 that it has already been established, then a determination is made in step 716 whether the account record is associated with the target device. If not, then the account record is associated with the target device in step 718.

Once the account record has been associated with the target device, or if it is determined in step 716 that it has already been associated, then a target list of available features is presented in step 720 for entitlement. A determination is then made in step 722 whether to generate an early binding entitlement for a feature. If not, then a determination is made in step 732 whether to continue early binding feature entitlement operations. If so, then the process is continued, proceeding with step 704. Otherwise early binding feature entitlement operations are ended in step 734. However, if it is determined in step 722 to generate an early binding entitlement for a feature, then a target feature is selected in step 724. A feature entitlement is then generated in step 726 by performing operations to associate the selected feature's corresponding entitlement data (e.g., purchase information, license information, etc.) with the aforementioned device record, account record, and other predetermined records. The resulting feature entitlement association is then added to the feature entitlement record in step 728. A determination is then made in step 730 whether to generate another early binding feature entitlement. If so, the process is continued, proceeding with step 724. Otherwise, a determination is made in step 732 whether to continue early binding feature entitlement operations. If so, then the process is continued, proceeding with step 704. Otherwise, the entitled features associated with the target device are implemented in step 734, followed by the delivery of the target device in step 736. Early binding feature entitlement operations are then ended in step 738.

Figure 8:
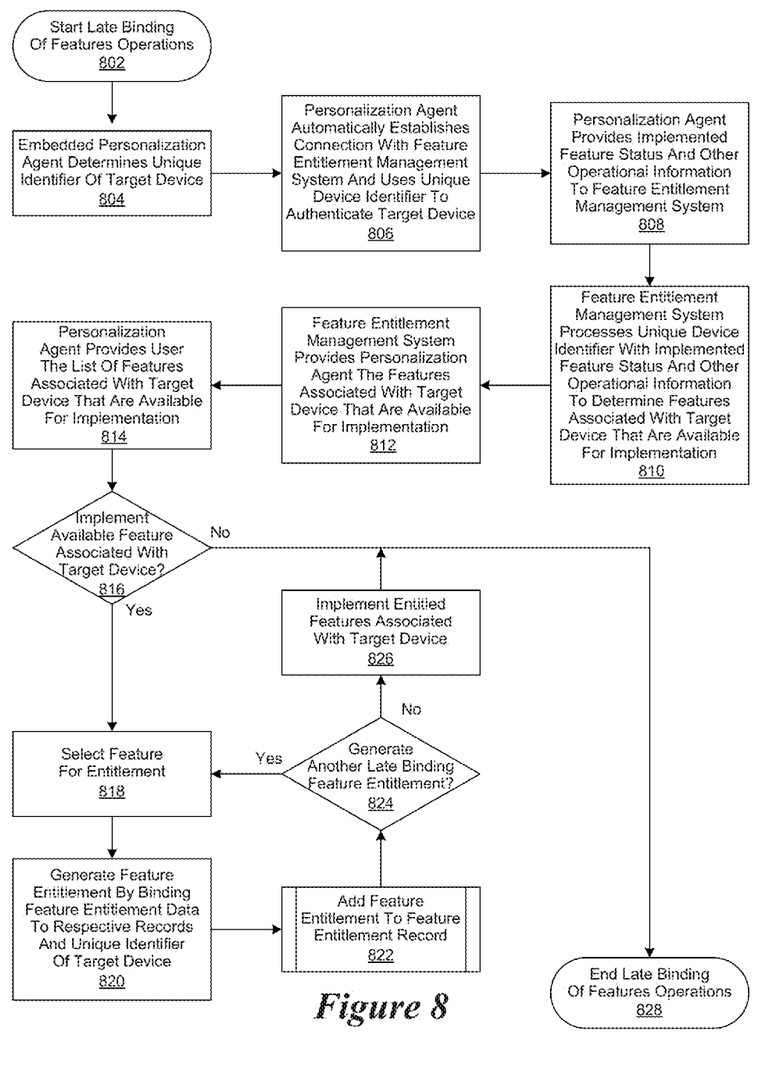
FIG. 8 is a generalized flow chart of the performance of late binding feature entitlement operations.

FIG. 8 is a generalized flow chart of the performance of late binding feature entitlement operations as implemented in accordance with an embodiment of the invention. In various embodiments, features associated with a target device are implemented after it is manufactured or after its delivery to a user. In these and other embodiments, the implementation of these associated features is accomplished through the performance of late binding entitlement operations, which result in the generation of a feature entitlements that entitle the implementation of features associated with the target device.

In this embodiment, late binding feature entitlement operations are begun in step 802, followed by an embedded personalization agent determining the unique identifier of a target device in step 804. In various embodiments, the unique device identifier associated with the target device is stored in its BIOS, flash memory, a hard disk, or other memory device. The personalization agent then automatically establishes a connection with the feature management entitlement system in step 806 and uses the target device's unique identifier to authenticate it to the feature entitlement management system.

Then, in step 808, the personalization agent provides implemented feature status and other operational information related to the target device to the feature entitlement management system. In turn, the feature entitlement management system uses the device's unique device identifier and the provided feature status and other operational information in step 810 to determine features associated with the target device that are available for implementation. Once the feature entitlement management system determines the features associated with the target device that are available for implementation, they are provided to the personalization agent in step 812. In turn, the personalization agent provides a list of the associated features available for implementation to the user of the target device in step 814.

A determination is then made in step 816 whether to implement a feature that is associated with the target device. If it is determined in step 816 to implement one of the associated features, then it is selected in step 818. A feature entitlement is then generated in step 820 by performing entitlement binding operations, as described in greater detail herein, to associate the selected feature's corresponding entitlement data (e.g., purchase information, license information, etc.) with the target device's associated device record, account record, and other predetermined records. The resulting feature entitlement association is then added to the feature entitlement record in step 822. A determination is then made in step 824 whether to generate another late binding feature entitlement. If so, then the process is continued, proceeding with step 818. Otherwise, the selected and entitled features associated with the target device are implemented in step 826 by processing the feature entitlement. In various embodiments, the feature entitlement is processed by a personalization agent associated with the target device. Thereafter, or if it was determined in step 816 to not implement an available feature associated with the target device, late binding entitlement operations are ended in step 828.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in respects.

What is claimed is:

1. A computer-implementable method for managing the entitlement of a feature associated with a device, comprising: receiving device identifier data associated with a device, the device identifier data received after the device is manufactured: processing the device identifier data to identify a feature associated with the device, the feature available for implementation; providing feature data corresponding to the feature; receiving user input data comprising feature acceptance data; processing the device identifier data, the feature data, and the feature acceptance data to generate feature entitlement data; processing the feature entitlement data to entitle the implementation of the feature, the processing the feature entitlement data to entitle of the implementation of the feature comprising a late binding of the feature with the device that comprises license data of the feature; and wherein the feature entitlement data is processed by a personalization agent associated with the device, the personalization agent determining a unique device identifier of the device, the unique device identifier being based at least in part upon the device identifier data, the personalization agent establishing a connection with a feature management entitlement system and using the unique device identifier to authenticate the device to the feature entitlement management system.

2. The method of claim 1, wherein the feature comprises at least one of the set of:
   a hardware feature;
   a software feature; and
   a service feature.

3. The method of claim 1, wherein the unique device identifier comprises a plurality of unique device component identifiers.

4. The method of claim 1, wherein the feature entitlement data comprises user data associated with the unique device identifier.

5. A system comprising: a processor a data bus coupled to the processor; and a non-transitory, computer-readable storage medium embodying computer program code, the non-transitory, computer-readable storage medium being coupled to the data bus, the computer program code interacting with a plurality of computer operations and comprising instructions executable by the processor and configured for: receiving device identifier data associated with a device, the device identifier data received after the device is manufactured: processing the device identifier data to identify a feature associated with the device, the feature available for implementation; providing feature data corresponding to the feature; receiving user input data comprising feature acceptance data; processing the device identifier data, the feature data, and the feature acceptance data to generate feature entitlement data; processing the feature entitlement data to entitle the implementation of the feature, the processing the feature entitlement data to entitle of the implementation of the feature comprising a late binding of the feature with the device that comprises license data of the feature; and wherein the feature entitlement data is processed by a personalization agent associated with the device, the personalization agent determining a unique device identifier of the device, the unique device identifier being based at least in part upon the device identifier data, the personalization agent establishing a connection with a feature management entitlement system and using the unique device identifier to authenticate the device to the feature entitlement management system.

6. The system of claim 5, wherein the feature comprises at least one of the set of:
   a hardware feature;
   a software feature; and
   a service feature.

7. The system of claim 5, wherein the unique device identifier comprises a plurality of unique device component identifiers.

8. The system of claim 5, wherein the feature entitlement data comprises user data associated with the unique device identifier.

9. A non-transitory, computer-readable storage medium embodying computer program code, the computer program code comprising computer executable instructions configured for: receiving device identifier data associated with a device, the device identifier data received after the device is manufactured; processing the device identifier data to identify a feature associated with the device, the feature available for implementation; providing feature data corresponding to the feature; receiving user input data comprising feature acceptance data; processing the device identifier data, the feature data, and the feature acceptance data to generate feature entitlement data; processing the feature entitlement data to entitle the implementation of the feature, the processing the feature entitlement data to entitle of the implementation of the feature comprising a late binding of the feature with the device that comprises license data of the feature; and wherein the feature entitlement data is processed by a personalization agent associated with the device, the personalization agent determining a unique device identifier of the device, the unique device identifier being based at least in part upon the device identifier data, the personalization agent establishing a connection with a feature management entitlement system and using the unique device identifier to authenticate the device to the feature entitlement management system.

10. The non-transitory, computer-readable storage medium of claim 9, wherein the feature comprises at least one of the set of:
    a hardware feature;
    a software feature; and
    a service feature.

11. The non-transitory, computer-readable storage medium of claim 9, wherein the unique device identifier comprises a plurality of unique device component identifiers.

12. The non-transitory, computer-readable storage medium of claim 9, wherein the feature entitlement data comprises user data associated with the unique device identifier.

* * * * *